United States Patent
Zich et al.

(10) Patent No.: US 6,854,719 B2
(45) Date of Patent: Feb. 15, 2005

(54) HEAT EXCHANGE AND MASS TRANSFER PACKING AND PACKED COLUMN UTILIZING SAME

(75) Inventors: Egon Zich, Leichlingen (DE); Helmut Jansen, Dormagen (DE); Thomas Rietfort, Bottrop (DE); Björn Kaibel, Hilden (DE)

(73) Assignee: Julius Montz GmbH, Hilden (DE)

( * ) Notice: Subject to any disclaimer, the term of this patent is extended or adjusted under 35 U.S.C. 154(b) by 0 days.

(21) Appl. No.: 10/434,910

(22) Filed: May 9, 2003

(65) Prior Publication Data

US 2004/0031584 A1 Feb. 19, 2004

(30) Foreign Application Priority Data

May 16, 2002 (DE) .......................................... 102 21 761

(51) Int. Cl.$^7$ ................................................. B01F 3/04
(52) U.S. Cl. ................ 261/95; 261/112.2; 261/DIG. 72
(58) Field of Search .......................... 261/94, 95, 112.1, 261/112.2, DIG. 72; 165/4, 104.15

(56) References Cited

U.S. PATENT DOCUMENTS

| 4,981,621 | A | * | 1/1991 | Pluss ........................ 261/112.2 |
| 5,876,638 | A | * | 3/1999 | Sunder et al. ........... 261/112.2 |
| 6,206,349 | B1 | * | 3/2001 | Parten ...................... 261/112.2 |
| 6,280,819 | B1 | * | 8/2001 | McKeigue et al. ......... 428/137 |
| 6,560,990 | B2 | * | 5/2003 | Hayashida et al. ........... 62/625 |
| 6,565,629 | B1 | * | 5/2003 | Hayashida et al. ........... 95/211 |
| 2003/0047821 | A1 | * | 3/2003 | Zich et al. .................. 261/153 |

FOREIGN PATENT DOCUMENTS

| DE | 100 01 694 | 7/2001 |
| EP | 0 858 830 | 8/1998 |
| WO | 97/16247 | 5/1997 |

* cited by examiner

Primary Examiner—Scott Bushey
(74) Attorney, Agent, or Firm—Herbert Dubno

(57) ABSTRACT

A heat exchange or mass transfer column in which the packing bed is formed from individual packing layers wherein the sheet metal plates of the packing have different thicknesses.

14 Claims, 2 Drawing Sheets

HEAT EXCHANGE AND MASS TRANSFER PACKING AND PACKED COLUMN UTILIZING SAME

FIELD OF THE INVENTION

Our present invention relates to a packing for heat exchange and/or mass transfer between liquids and gases in columns in which the packing bed or beds are formed from individual packing layers.

BACKGROUND OF THE INVENTION

In distillations, absorption, gas-scrubbing and like operations, columns are widely used which include baffling structures to promote the heat exchange and mass transfer between a liquid phase and a gas phase. These structures can be trays or the like, for example, bell type or bubble trays, sieve trays and valve trays, or the structures can be randomly arranged packing bodies like, for example, Raschig rings, Pall rings or saddle-shaped bodies, or the structures can be ordered or structured packings like, for example, plates composed of sheet metal with corrugations or folds.

The ordered or structured packing can have geometries providing a cross channel structure or cross flow channels. Such structured packings are now widely used. As a general matter, the packed columns have a maximum capacity for heat exchange and/or mass transfer, measured by the throughput of one or both of the fluids which is limited by the commencement of flooding. This applies as well to cross-flow channel structured packings. Visual monitoring of flooding in distillation columns which may be equipped with structured packing in a cross channel system have shown that the flooding appears to start at lower edges of individual packing layers. To increase the efficiency of the mass or heat exchange or the capacity of such packings, efforts have been made to so modify the lower edges and partially, where appropriate, upper edges of individual packing layers, to increase the throughputs of liquid and gas through the packing in these regions.

For example, EP 858 830 A1 provides an increase in the spacing between the neighboring packing elements at the lower portion of the packing layers, especially at the lower edges by reducing in these regions the bend height. Further possibilities have been described as well, for example, partial or complete removal of part of the material of the packing, for example, removal of a portion of every second packing element at the lower ends of the packing layers.

In WO 97/16247 an alternative has been described in which the geometry of the cross channel structure is altered. The bends or folds no longer are straight as in earlier cross channel structures but are given an S shape and are so arranged that the bend or fold direction at the lower and upper ends of the packing layers run substantially vertically.

DE 100 01 694 A1 describes a similar packing in which the folds or bends only at the lower end are redirected toward the vertical.

When the packings have been fabricated from sheet metal in the past, independently of the geometries described above, efforts were made to keep the costs down by reducing the wall thickness of the packing sheets or plates. At the present time, the various manufacturers of such cross-channel structured packings have tended to use sheets or plates which have been reduced in wall thickness to 0.075 to 0.1 mm from sheet thicknesses of 0.15 to 0.2 mm as were utilized in earlier periods. Both in the earlier periods and at the present, the packings were composed of individual layers, plates or sheets of the same wall thickness over the entire packing bed.

Advantageously, the reduction in the uniform wall thickness has resulted in reduced material cost and a reduced weight of the baffling in the column. However, with that reduction in the wall thickness there has been some reduction in the mechanical stability of the packing and some limitations as to the packing height which can be used since there is a danger of mechanical deformation of the packing in mounting in the column. Undesired deformation can detrimentally effect the distribution of liquid in the packing giving rise to stranding and interfering with turbulence with an end result of a loss in efficiency.

OBJECTS OF THE INVENTION

It is, therefore, the principal object of the present invention to provide an improved packing and especially a structured cross flow packing for a heat exchange and/or mass transfer column whereby the amount of material required for a given packing volume can be reduced, along with the cost of the packing, without loss in efficiency and stability.

It is also an object of the invention to provide a heat exchange or mass transfer column having a structured packing with the advantages of low material utilization and cost and high efficiency and stability.

A further object of this invention is to provide a column packing for the purposes described which constitutes an improvement over those currently in use and of the prior art.

SUMMARY OF THE INVENTION

These objects and others which will become apparent hereinafter are attained in accordance with the invention with a heat exchange or mass transfer column having a column packing of at least one packing bed in the form of a structured bed of cross channel configuration and composed of a multiplicity of packing layers consisting of corrugated sheet metal and wherein individual layers of the sheet metal of the packing bed have different wall thicknesses. The sheet metal layers of the packing of the invention with their different thicknesses can be distributed in the packing in whatever manner is desired and the layers of greater wall thickness can adjoin one another or layers of smaller wall thickness in any order or in any number although certain parameters as described below are preferred or greatly preferred.

The packing of the invention consists of a multiplicity of individual layers and is assembled from individual layers with the directions of the corrugations of adjoining layers crossing one another, preferably at angles between 60 to 90°; these layers, however, are not all of the same wall thickness but can have wall thicknesses that differ from one another. This yields a saving of material and cost and can nevertheless provide a packing which at the minimum volume for a given capacity in terms of heat and material transfer can nevertheless retain mechanical stability and efficiency.

Preferably the predominant number of individual layers are sheets or plates of the lesser wall thickness, i.e. the thinner plates while a lesser proportion are plates of the greater wall thickness, i.e. the thicker layers. The thinner plates can have wall thicknesses of 0.01 to 0.2 mm, preferably 0.05 to 0.1 mm. The thicker plates may have wall thicknesses of 0.05 to 0.5 mm, preferably 0.1 to 0.2 mm and the wall thickness of individual layers of the sheet metal of greater thickness can be 2.5 to 50 times the wall thickness of individual layers of the sheet metal of lesser thickness. The sheet metal layers of greater thickness appear to provide the static function of ensuring sufficient mechanical strength while the layers of lesser wall thickness predominantly serve for the heat exchange and/or mass transfer. The ratio of the number of thin to thick layers is preferably 20:1 to 1:2, most advantageously 15:1 to 2:1, and especially advantageously 10:1 to 5:1.

The individual layers of the packing can be held together by horizontally extending rods and assembled to a packing element therewith. The usual liquid strippers can be provided on the edges of the packing element.

The mechanical stability and shape retentiveness of the packing elements are best when the outer layers have the greatest wall thickness or are composed of the sheet metal element of the greater wall thickness whereas the layers between them can have the lesser wall thickness. The layers of lesser wall thickness have a positive effect as well since they ensure that there will be better contact between the crests of the corrugations and thus better spreading of the fluids in the packing elements. When the packing elements are stacked one above the other, moreover, better contact is provided between the individual layers and the pressing together of the individual layers can eliminate the effect of unavoidable fabrication imprecision in the vertical direction. Upon mounting, the edges of the plates may also be bent or folded more strongly to reduce any gaps in the vertical direction between the successive packing elements. As a result, underlying packing elements can take up the downwardly flowing liquid more directly and a transverse flow of the liquid at the lower end of each packing layer before it reaches the next packing layer can be avoided. This ensures a uniform distribution of the liquid from packing layer to packing layer as the liquid passes downwardly through the layer stacks.

During the mounting of the layer stacks, therefore, some deformation and compression of each stack by the weight of an overlying stack is desirable. Indeed, in addition to weighing of the stacks, statically by the stacking process, the individual layers can be dynamically stressed by hammering them into place or statically stressed by loading them with weights, all so that the number of contact locations within the bed between the layers is increased.

The heat exchange or mass transfer column of the invention has at least the lowermost packing layer or at least an uppermost packing layer formed from the sheet metal layer or layers of the greater wall thickness.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
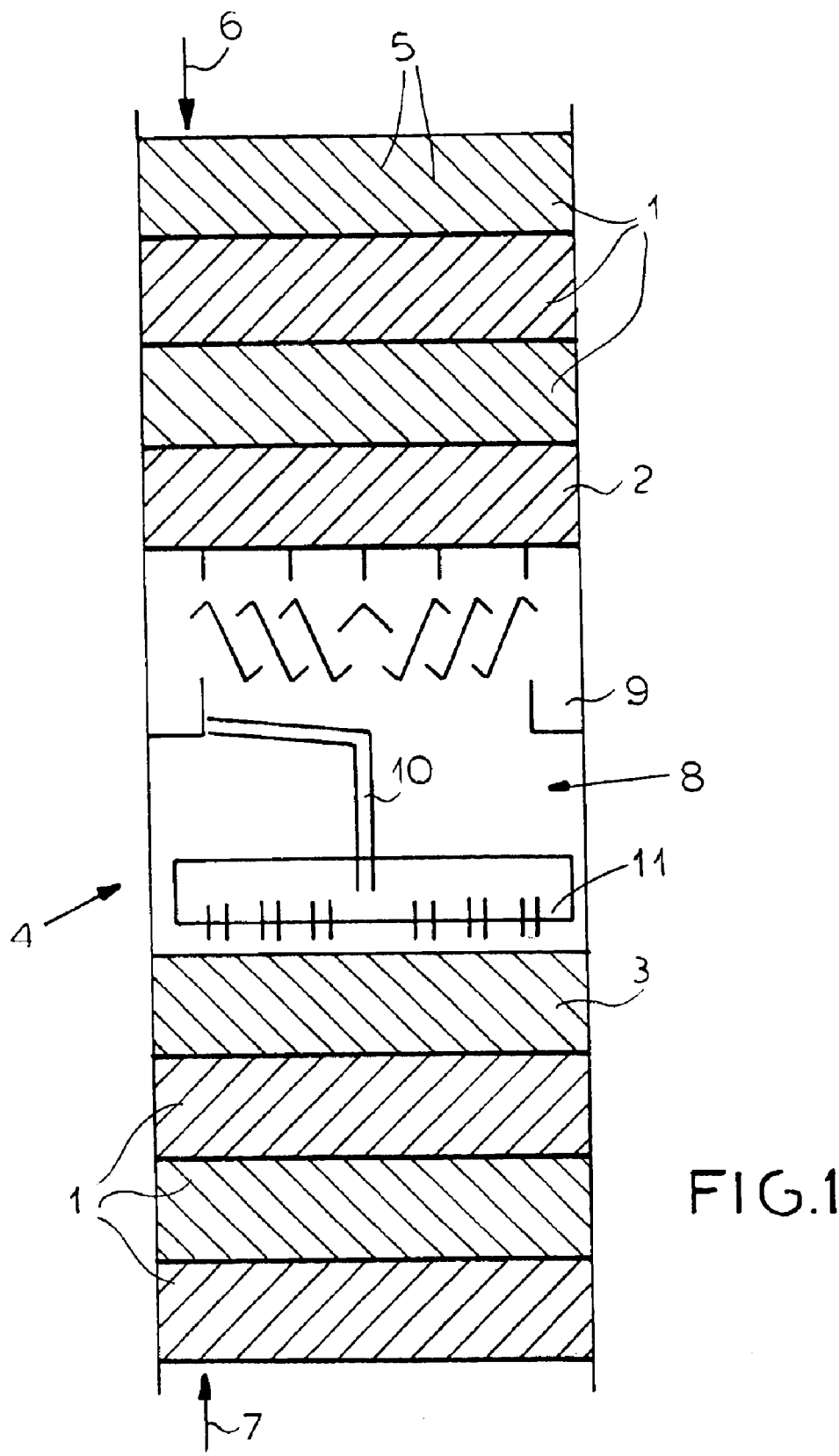
FIG. 1 is a diagrammatic cross section through a heat transfer and/or mass exchange column illustrating principles of the invention.

FIG. 1 shows a column for heat exchange or mass transfer between a liquid and a gas which is provided with a plurality of packings 1–3. The liquid is assumed to pass downwardly through the column in the direction represented by the arrow 6 while the gas passes upwardly through the column as represented by the arrow 7. The packing layers 1 and 2 of the upper bed and the packing layers 3 and 1 of the lower bed are all composed of corrugated or folded plates or sheets 5 such that the corrugations, ribs, folds or bends of neighboring sheets or plates cross one another at an angle of 60 to 90° so that plates with corrugations that run generally crosswise to each other or have their corrugations turned at angles of 60 to 90° adjoin one another, preferably in the manner described in DE 100 01 694.

Between these beds, a liquid redistributor stage 8 can be provided which contains a collecting trough 9 collecting the liquid from the periphery of the upper bed and feeding that liquid via a downcomer 10 to a redistributor tray 11 which feeds the liquid over the entire cross section of the layer 3 of the next lower bed. Each column may have a multiplicity of such redistributors and greater numbers of structured cross channel layers forming beds as shown. The individual layers can be connected by rods passing through them and can be provided with liquid strippers at the edges of the packing.

Figure 2:
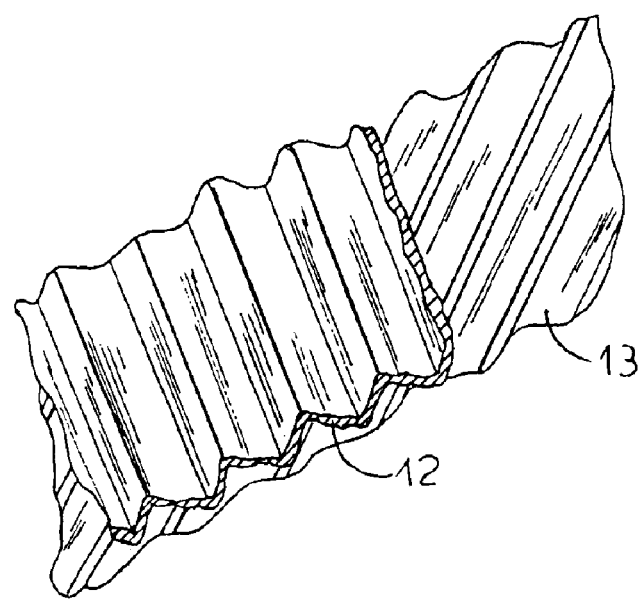
FIG. 2 is a detail view of a pair of metal layers or sheets of packing element according to the invention showing the crossing corrugations.
Figure 3:
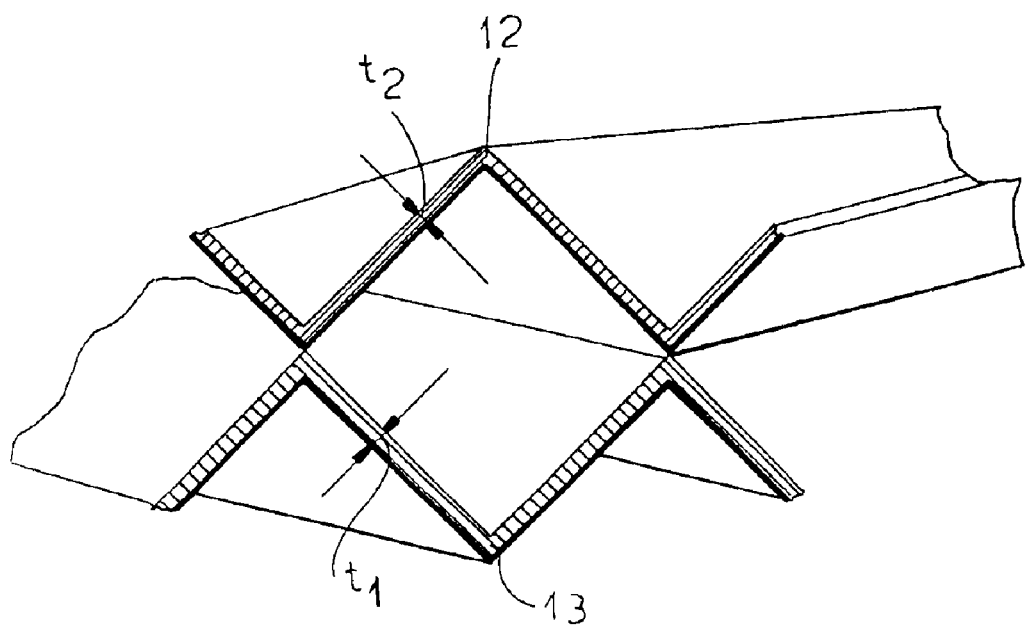
FIG. 3 is a detail section showing the different layer thicknesses.

As can be seen from FIG. 2, the packings are formed by crossing channels defined by the corrugated plates 12 and 13 of which most of the plates 12 may be thin wall plates with a wall thickness of say 0.01 to 0.2 mm, preferably 0.05 to 0.1 mm while other plates 13 have greater wall thicknesses of, say 0.05 to 0.5 mm, preferably 0.1 to 0.2 mm. The packings with plates of nonuniform wall thickness can be provided, for example, as the lowermost layer 2 of the upper bed or the uppermost layer of the lower bed while the remaining packing layers 1 may all be of the thin wall plate type. If desired, the layers 2 and 3 may entirely be composed of the relatively thick wall plates. This prevents mechanical damage to these most highly stressed packing layers.

We claim:

1. A heat exchange or mass transfer column having a column packing of at least one packing bed comprised of a multiplicity of packing layers consisting of corrugated sheet metal and wherein individual layers of the sheet metal of said packing have different wall thicknesses.

2. The heat exchange or mass transfer column defined in claim 1 wherein support sheet metal layers of at least one packing bed have greater wall thicknesses than other sheet metal layers of said at least one packing bed.

3. The heat exchange or mass transfer column defined in claim 1 wherein at least one of the packing beds has sheet metal layers of different wall thicknesses.

4. The heat exchange or mass transfer column defined in claim 1 wherein the different wall thicknesses of the individual layers of the sheet metal are a thickness of 0.01 to 0.2 mm for the wall thicknesses of individual layers of the sheet metal of lesser thickness and a thickness of 0.05 to 0.5 mm for the wall thicknesses of individual layers of the sheet metal of greater thickness.

5. The heat exchange or mass transfer column defined in claim 4 wherein the wall thickness of individual layers of the sheet metal of greater thickness is 2.5 to 50 times the wall thickness of individual layers of the sheet metal of lesser thickness.

6. The heat exchange or mass transfer column defined in claim 1 wherein at least the lowermost packing layer comprises a sheet metal packing layer with the greater wall thickness.

7. The heat exchange or mass transfer column defined in claim 6 wherein at least an uppermost packing layer comprises a sheet metal layer with the greater wall thickness.

8. The heat exchange or mass transfer column defined in claim 1 wherein at least an uppermost packing layer comprises a sheet metal layer with the greater wall thickness.

9. The heat exchange or mass transfer column defined in claim 1 wherein the different wall thicknesses of the individual layers of the sheet metal are a thickness of 0.05 to 0.1 mm for the wall thicknesses of individual layers of the sheet metal of lesser thickness and a thickness of 0.1 to 0.2 mm for the wall thicknesses of individual layers of the sheet metal of greater thickness.

10. The heat exchange or mass transfer column defined in claim 1 wherein the ratio of the number of layers of the sheet metal of lesser thickness to the number of layers of the sheet metal of greater thickness is 20:1 to 1:2.

11. The heat exchange or mass transfer column defined in claim 10 wherein the ratio is 15:1 to 2:1.

12. The heat exchange or mass transfer column defined in claim 11 wherein the ratio is 10:1 to 5:1.

13. The heat exchange or mass transfer column defined in claim 1 wherein said packing bed comprises a plurality of packing layers consisting of corrugated sheet metal of individual layers having a layer wall thickness and at least one packing layer above or below the other packing layers and having individual layers of a greater wall thickness.

14. A column packing forming at least one packing bed and comprised of packing layers consisting of corrugated sheet metal with adjoining sheet metal plates having crossing corrugations in contact with one another and wherein individual layers of the sheet metal plates have different wall thicknesses.

* * * * *